UNITED STATES PATENT OFFICE.

ARTHUR T. WOODWARD, OF NEW YORK, ASSIGNOR OF ONE-HALF OF HIS RIGHT TO SAMUEL A. WOOD, OF BROOKLYN, N. Y.

PLASTIC COMPOUND.

SPECIFICATION forming part of Letters Patent No. 225,679, dated March 16, 1880.

Application filed February 7, 1880.

*To all whom it may concern:*

Be it known that I, ARTHUR T. WOODWARD, a citizen of the United States, residing at New York city, in the county of New York and State of New York, have invented new and useful Improvements in Plastic Compounds for Use in Various Arts, of which the following is a specification.

My invention relates to a plastic compound impervious to water and suitable for various uses in the arts, such as forming an insulating bed for underground and submarine telegraph-wires, insulators for electrical conductors supported in the air, bearings for journals, and protecting-coating for metallic surfaces, such as ships' bottoms and other articles exposed to the action of salt-water.

It consists in a mechanical compound composed of silica and either a vegetable or mineral resin or pitch, such as colophony or asphaltum, both separately pulverized to impalpable powder, intimately mixed, and subjected to heat sufficient to melt the resin, which then coats each of the atoms of silica and causes them to adhere together when cooled, so as to form a mass of exceeding hardness and great density, entirely impervious to water, possessed of remarkable insulating properties with respect to electricity, and capable of resisting the action of saline solutions. It is this latter property which gives it great utility as a protecting-coating for the bottoms of ships, where it prevents the formation of barnacles and that corrosion which usually takes place around the sheathing-nails. Both the silica and resin or pitch are electric insulators, and their mixture produces a material easily molded and applied wherever desired. After the two substances above named have been thoroughly mixed, boiled or raw linseed-oil, or other suitable drying-oil, with a slight admixture of turpentine or benzine, if desired, may be added, to cause the resin or pitch to readily melt, and also to bring the mass to a more fluent condition when it is desired to mold it into articles of small size.

On account of the great strength and durability of this compound when thoroughly set and cooled, the articles formed of it may be used without metallic supports. It may be molded in any of the ordinary forms of molds used for molding heated plastic materials or metals, and may also be molded in wooden or sand molds.

The proportions of materials which I prefer to employ are approximately as follows: For one ton of the compound, powdered silica, such as glass, eighteen hundred pounds; powdered vegetable or mineral resin or pitch, one hundred and seventy-five pounds. To these may be added, as above stated, about twenty-five pounds of boiled or raw linseed-oil, with a slight addition of turpentine or benzine or other suitable drying-oil.

The ingredients may be reduced to a fluid state in an ordinary caldron, such as is used in boiling pitch and paving or roofing compounds.

It is quite important that the silica and resin or pitch shall be pulverized separately, as they can thus be thoroughly reduced to impalpable powder, which would be almost impossible were they attempted to be powdered together. In the latter case the compound would not be reliable, owing to the great liability of flakes or lamina of the resin or pitch being formed, which would result in globules of this material containing no silica in the mass after cooling.

What I claim is—

The plastic compound herein described, composed of pulverized silica—such as flint, glass, or sand—and a mineral or vegetable resin or pitch intimately mixed therewith, either with or without boiled linseed-oil or other drying-oil, or turpentine or benzine, substantially as set forth, and in the approximate proportions specified.

In testimony whereof I have hereunto set my hand in the presence of two subscribing witnesses.

A. T. WOODWARD.

Witnesses:
ALBERT H. NORRIS,
JAMES A. RUTHERFORD.